United States Patent [19]

Grossman

[11] Patent Number: 4,963,783
[45] Date of Patent: Oct. 16, 1990

[54] ELECTRODED PHOTOCHEMICAL LAMPS FOR PHOTOCHEMICAL MERCURY SEPARATION

[75] Inventor: Mark W. Grossman, Belmont, Mass.

[73] Assignee: GTE Products Corporation, Danvers, Mass.

[21] Appl. No.: 286,313

[22] Filed: Dec. 19, 1988

[51] Int. Cl.$^5$ .............. H01J 61/20; H01J 61/34; B01D 5/00; B01D 59/38
[52] U.S. Cl. ..................... 313/22; 313/565; 313/639; 203/5; 204/157.2
[58] Field of Search .......... 313/22, 23, 25, 24, 313/35, 36, 639, 642, 565; 203/5; 75/81; 420/526; 204/157.2

[56] References Cited

U.S. PATENT DOCUMENTS

| | | | |
|---|---|---|---|
| 3,665,235 | 5/1972 | Hugot | 313/26 X |
| 4,145,634 | 3/1979 | Evans et al. | 313/490 |
| 4,746,382 | 5/1988 | Grossman et al. | 313/22 |

OTHER PUBLICATIONS

J. Maya et al., *Science*, 226:435–436 (10/1984).
C. R. Webster and R. N. Zare, *J. Phys. Chem.*, 85:1302–1305 (12/1985).
J. Waymouth, *Electric Discharge*, MIT Press, pp. 13–20 (12/171).

*Primary Examiner*—Kenneth Wieder
*Attorney, Agent, or Firm*—Hamilton, Brook, Smith & Reynolds

[57] ABSTRACT

An apparatus and method for the photochemical isolation and separation of specific mercury isotopes from mixtures of mercury isotopes is disclosed. The system employs an electroded mercury photochemical lamp having a uniform, controlled output. The lamp is controlled by the use of a fluid heat transfer medium to control the partial pressure of mercury vapor within the lamp. This allows a means for controlling both the bandwidth and intensity of the lamp output.

11 Claims, 3 Drawing Sheets

ELECTRODED PHOTOCHEMICAL LAMPS FOR PHOTOCHEMICAL MERCURY SEPARATION

TECHNICAL FIELD

This invention is in the field of physics. It relates to an electroded mercury lamp which is capable of providing resonance radiation with a well defined linewidth and intensity.

BACKGROUND OF THE INVENTION

The specific excitation of mercury isotopes by photochemical means is well established. See Webster, C. R. and R. W. Zare, "Photochemical Isotope Separation of Hg-196 by Reaction with Hydrogen Halides," *J. Phys. Chem.*, 85:1302 (1981), the teachings of which are incorporated herein by reference.

Mercury lamps are commonly used as the excitation source of Hg isotope-specific photochemical reactions. To be successful, the photochemical separation of a single isotope requires the spectral bandwidth of the exciting mercury lamp or laser source to be sufficiently narrow to excite only the specific isotope of interest. This specificity depends, in part, on the spectral bandwidth of the source. The rate and extent of separation of the particular isotope from the feedstock can be strongly dependent on the intensity of the radiation emitted from the mercury lamp.

The vapor equilibrium pressure of the Hg used in current mercury lamps strongly affects the spectral linewidth and intensity of the light which is emitted from these lamps. Previously described systems used for this purpose are not able to adequately control the Hg vapor pressure inside of the lamps. This is due to the fact that the lamp cold spot, (i.e., the lowest temperature region within the lamp) is not well established. The cold spot temperature is critical as it determines the equilibrium vapor pressure within the lamp.

After start-up of a typical photochemical lamp, many hours of lamp operation may be required to fix the cold spot region. During this transition time, a definite vapor pressure of Hg within the lamp envelope is not attained. This variation in the vapor pressure of the mercury within the lamp can cause disturbances in the linewidth and intensity of resonance radiation emitted. Thus, undesirable isotopes of Hg can be stimulated and the rate of separation of the desired isotope of mercury can be affected. Further, without identifying the location of the cold spot, it may be difficult to accurately monitor the Hg vapor pressure.

Microwave powered, electrodeless lamps have previously been used in photosensitized mercury isotope separation processes. One such lamp is described in U.S. Pat. No. 4,746,832 issued May 24, 1988, to Grossman et al., entitled "Controlling the Vapor Pressure of a Mercury Lamp." These microwave lamps have a mercury vapor envelope which is partially inserted into a microwave source. When microwave radiation is generated, it excites the vapor mixture within the envelope, thereby causing the lamp to emit light. Lamps of this type require accurate control of cold spot temperature regions and have power coupling characteristics which have exhibited great sensitivity to the overall lamp length. Additionally, the power input for microwave lamps is strongly dependent on the relative positions between the microwave cavity acting as the microwave source and the lamp envelope for conditions at which photochemical separation processes are operated.

The vapor equilibrium pressure in microwave lamps can be controlled by establishing and controlling two temperature zones within the lamp. The first of the two temperature zones establishes a cold spot and the second zone is maintained at a temperature equal to or greater than the first zone. In this manner, greater control of the temperature within the lamp can be obtained. This allows the equilibrium vapor pressure of the Hg within the entire lamp to be regulated. However, lack of accurate cold spot control and difficulty in increasing lamp length with constant power coupling throughout the discharge length have been found with this type of lamp. Consequently, a variety of variables must be carefully monitored to achieve a constant equilibrium pressure of the Hg vapor and the desired spectral emission.

There have been additional methods reported for enriching isotope $^{196}$Hg by isotope-selective photooxidation of mercury vapor using microwave lamps, (see, for example, M. Desnoyer et al., *J. Ch. Phys. Tome*, 60:14–16 (1963); J. P. Morand et al., *J. Chim. Phys.*, 65:2058–2068 (1968); J. P. Morand et al., *Energie Nucleaire*, 10:362–366 (1968); G. Mueller et al., *Iosotope Practice*, 17(5):200–205 (1980); and G. Mueller et al., German Patent No. 124,144 (1977)). Each of the microwave lamps described in the above references requires the use of a single water cooling loop. This design displays large power losses due to the coupling of a large amount of microwave power into the water loop.

SUMMARY OF THE INVENTION

This invention comprises an apparatus and a process for establishing a desired spectral linewidth of radiation emission from an electroded mercury vapor lamp by controlling the equilibrium vapor pressure within the lamp envelope. This is achieved by establishing and controlling a temperature zone within at least one region of the lamp envelope by surrounding at least one section of the envelope with an outer, elongated cylindrical tube which serves to define a heat transfer region. A heat transfer medium, preferably water, at a controlled temperature is circulated through the heat transfer region, thereby regulating the temperature of the lamp envelope. In this manner, the temperature, and thus, the equilibrium vapor pressure of Hg vapor contained within the entire lamp envelope can be controlled. Consequently, the bandwidth and intensity of the radiation emitted from the lamp is controlled.

Unlike microwave mercury lamps which often exhibit decreased performance when cooled with water (which absorbs microwave radiation), the electroded lamps of this invention do not suffer such power losses. Thus, the positive column electroded lamps described herein provide an increased yield of product in the $^{196}$Hg photochemical enrichment process. See, J. Waymouth, "Electric Discharge Lamps," MIT Press, p. 13–20 (1971), the teachings of which are incorporated herein by reference. Additionally, the output of these lamps can be increased by increasing the length of the lamps while maintaining the input power per unit length at a constant value. A greater number of photons per second are generated thereby which results in a higher yield of product in the photochemical enrichment process.

DETAILED DESCRIPTION OF THE INVENTION

Figure 1:
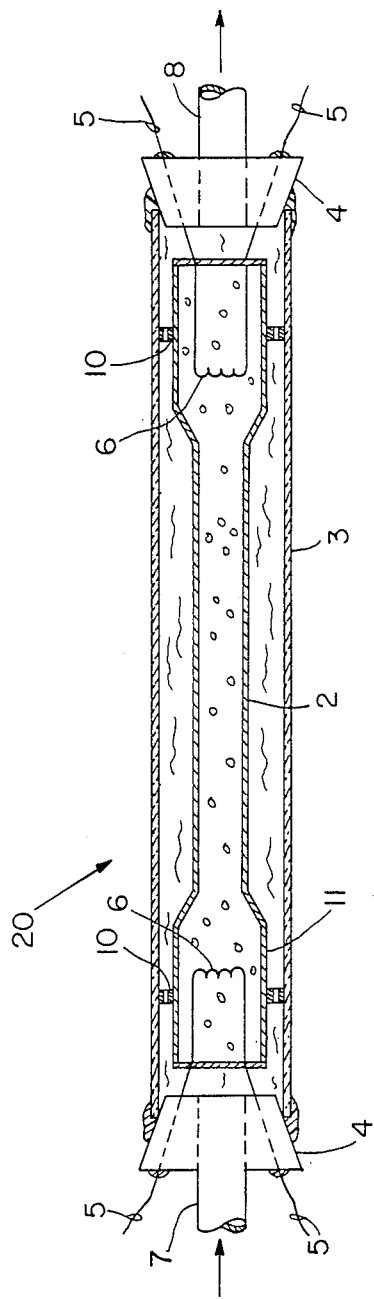
FIG. 1 is a schematic representation of the electroded photochemical lamp of this invention.

In accordance with this invention, a process and apparatus for controlling the spectral linewidth of radiation emitted from a mercury-noble gas lamp by controlling the mercury vapor equilibrium temperature and pressure within the lamp is provided. This provides a lamp useful for a photochemical separation process of mercury, said lamp having an output which is highly uniform and controllable. It is necessary to control the temperature of Hg vapor within the lamp because the vapor temperature determines the vapor equilibrium pressure within the lamp, which greatly influences the linewidth and intensity of the radiation wavelength emitted from the lamp. By creating a uniform temperature zone within the lamp, a known and fixed vapor equilibrium pressure can be established throughout the lamp. This eliminates long-term transient lamp output and results in a more reproducible output linewidth and intensity.

In a photochemical enrichment process for mercury in which specific mercury isotopes are to be produced and separated, the volumetric product yield depends greatly on the number of photons at a specific wavelength available to enrich mercury atoms to the desired isotopic state. In the electroded lamps of the present invention, a greater number of photons can be readily produced by increasing the lamp length while maintaining the input power per unit length at a constant value.

The invention comprises an electroded mercury-inert gas lamp for emission of 257 nm radiation for the photochemical separation of $^{196}Hg$. At least two electrodes are positioned and sealed at each end of a sealed lamp envelope which contains mercury vapor and one or more inert gasses. The sealed lamp envelope is surrounded at least in part by an elongated tube which defines a region for controlling a heat exchange medium which controls the temperature of the inner, sealed lamp envelope.

In one embodiment, uniform temperature is created in the Hg lamp by circulating $H_2O$ at a predetermined temperature about an isolated section of the lamp. Other fluids, or inert gases such as argon, helium, xenon and neon, can be selected depending on their boiling point behavior to provide the desired uniform temperature of the inner discharge envelope.

The circulating heat transfer medium also prevents the formation of $O_3$ (ozone) by purging $O_2$ in the vicinity of the lamp. Ozone is created when $O_2$ is exposed to 185 nm radiation which may be emitted by the lamp. Ozone, in turn, absorbs various wavelengths of radiation emitted from the lamp. This is undesirable because radiation having a wavelength of 253.7 nm, useful for the photochemical separation of $^{196}Hg$, is absorbed by $O_3$. Thus, in a preferred embodiment, a fluid or inert gas is circulated about the entire exterior of the lamp envelope, thereby purging all of the $O_2$ from the immediate vicinity of the envelope. This allows for a greater emmission intensity of the particular, desired radiation from the lamp envelope.

In a preferred embodiment, the outer jacket comprises a quartz cylinder. This outer jacket serves several purposes. First, it allows for the use of a gas purge, if desired, for eliminating $O_2$ about the transmission section, thereby reducing $O_3$ formation. Second, if the outer jacket is designed to be demountable, it permits the interchange of different inner lamp envelopes. This makes possible the isolation of different Hg isotopic distributions using the same outer jacket. Also, lamp envelopes having different diameters can be used to affect the emitted linewidth of radiation.

The fact that the outer tube can be demountable allows for the use of outer tubes of different types of materials which can selectively filter certain emitted wavelengths. For example, by changing the outer tube material to Vycor 7910, it is possible to filter wavelengths below 200 nm thereby eliminating ozone formation in the region surrounding the lamp.

FIG. 1 illustrates a lamp which incorporates the elements of this invention.

The mercury lamp 20 of FIG. 1 comprises an inner lamp envelope 2 and an outer jacket 3. In the preferred embodiment, both the envelope 2 and the outer jacket are constructed of quartz. The envelope 2 can be of various diameters depending on the desired optical depth. A larger diameter provides greater power density and broader bandwidth. For the isotopic separation of $^{196}Hg$, the inner diameter of the envelope is typically about 10 mm. The envelope 2 typically contains a source of Hg such as elemental Hg as well as an inert gas such as argon. However, any inert gas which is compatible with Hg vapor can be used. Typically, between about 1 and 2 mg of Hg is contained within lamp envelopes which have an inner diameter of about 10 mm. The length of the lamp can be from about 30-150 cm with a preferred length of about 40 cm.

A tapered stopper 4, typically of an elastomeric material, is disposed at each distal end of the outer jacket 3 and serves to substantially center the outer jacket around at least one section of the envelope 2. Furthermore, the tapered stopper guides and positions an electrode lead 5 through both the stopper and the outer jacket, and into the envelope where it provides current for the electrodes 6. In the preferred embodiment, the electrodes are shaped as coils and able to withstand a current of at least about 5 amperes. The tapered stoppers also contain openings in their centers which provide for an inlet 7 and outlet 8 stream of circulating heat transfer medium which is preferably water. The heat transfer medium circulates about at least one portion of the inner discharge envelope 2. The heat transfer medium then exits the lamp at outlet 8 contained in the outer jacket. Tubes, 11, preferably comprising a heat resistant glass are connected to each end of the envelope to provide regions to contain the electrodes and to further provide regions for mounting the envelope within the jacket. These tubes 11 are preferably separated from the outer tube with spacers 10 preferably comprising elastomeric materials. It is pointed out that the spacers 11 must have openings which allow the heat transfer medium to travel through the lamp.

The temperature of the inner envelope 2 is controlled by the temperature of the circulating heat transfer medium. As the temperature of the heat transfer medium is increased or decreased, the corresponding temperature of the inner envelope also increases or decreases. The linewidth of the emitted radiation is typically affected greatly by temperatures between 15° C. and 50° C. The emission intensity depends strongly on the temperature of the inner envelope.

Measuring the linewidth and the intensity of lamp emmissions via a suitable detector permits a calibration of linewidth and intensity versus the temperature of the heat transfer medium. Furthermore, the lamp wall temperature can be directly measured to relate linewidth and line intensity to wall temperature.

A difference exists between the lamp temperature and the temperature of the circulating heat transfer medium. The difference is usually determined by a calculation based on energy balance and heat transfer relationships. Thus, for a 40 watt lamp, 4 feet long, and 1.5 inches in diameter, the temperature of heat transfer medium has been found to be about 2° C. lower than the temperature of the wall of the inner quartz envelope during normal operation. This difference is particularly important for theoretical modeling, but is generally not critical for the application of the present invention.

The entire lamp assembly can be placed within a mercury vapor filter. In a broad embodiment, the filter comprises a hollow axial elongate torus containing mercury vapor and an inert gas. This structure can be formed by the combination of two tubes, preferably quartz, where an inner tube is inserted into an outer tube and the tubes are sealed at both ends. This encloses a medium which can be made to contain a gaseous Hg vapor medium which transmits wavelengths of light desirable for the photochemical separation of $^{196}$Hg or specific isotopes of Hg.

Table 1 compares irradiance measurements for three microwave lamps and an electroded lamp typical of this invention. The first of the microwave lamps contains vapor of natural Hg. The second microwave lamp contains $^{196}$Hg vapor and is used with a filter containing natural Hg vapor. The third microwave lamp is similar to the second, but the filter has been removed. The electroded lamp contains natural Hg vapor. Although the irridiance in uw/cm² for the electrode lamp appears to be less than that of the first microwave lamp, it is pointed out that the microwave lamp was much closer to the detector and had much more exposed surface area. Upon calculating the irridiance values using correction factors to take their differences into account, the 253.7 nm emission per unit length per net input power is several times larger for a 10 mm diameter electroded lamp compared to a 5 mm diameter microwave lamp.

Figure 2:
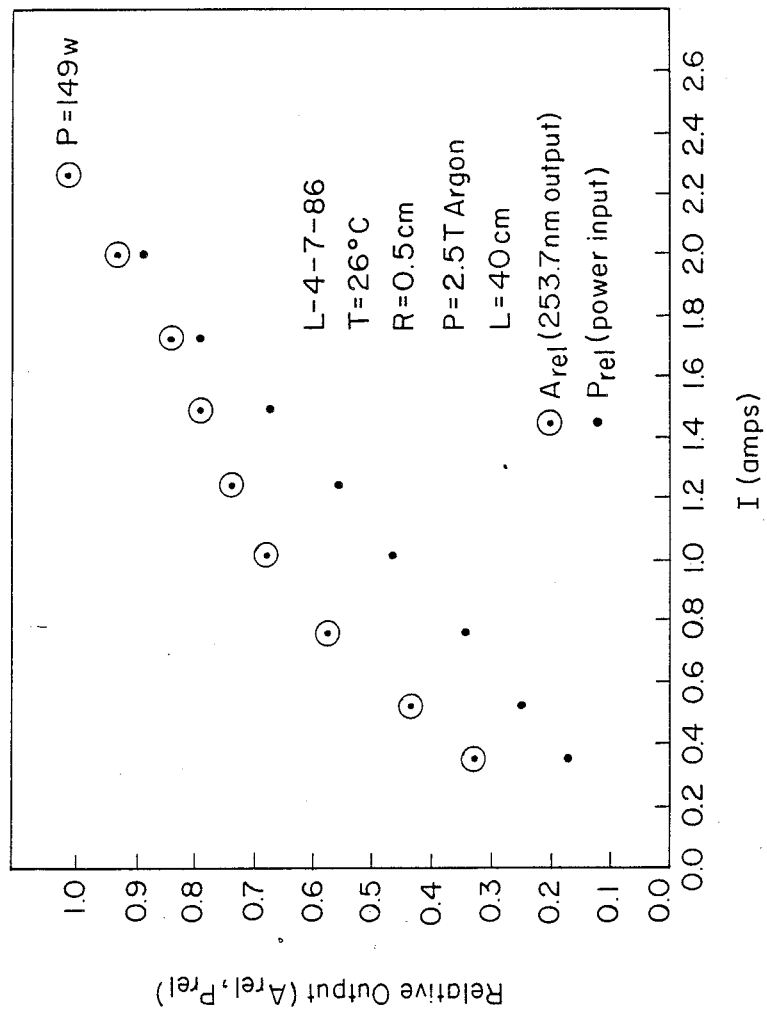
FIG. 2 is a plot of lamp power and relative output at a selected wavelength versus time for an electroded photochemical lamp.

FIG. 2 is a plot of the relative output of 253.7 nm radiation and lamp power versus lamp current. This illustrates a further feature of the electroded lamp, that is, the ability to reproducibly control the 253.7 nm ouput by adjusting the discharge current. In FIG. 2, this was done by changing the open circuit voltage. The lamp current used for the data in Table 1 was 1.0 Amp, however, as can be seen in FIG. 2, substantially higher output values can be obtained for higher current values. In FIG. 2, the 253.7 nm data was obtained by placing a quartz optical fiber over the lamp center and coupling the fiber to a detector.

In a preferred embodiment of this invention $^{196}$Hg is produced by enriching mercury compounds using radiation with a wavelength of 253.7 nm. The control of the specific wavelength is very dependent upon the vapor equilibrium temperature within the lamp envelope, which depends, in turn, upon the lowest temperature within the envelope. The vapor pressure of Hg within the envelope (for useful mercury isotope separation) and the intensity of the emitted radiation are proportional with a variation of about 10-15%.

If the mercury vapor pressure increases, the corresponding linewidth of the emitted radiation also increases. This causes other isotopes of mercury to become excited. Such an effect is undesirable, as it leads to a separation which yields a product having lower isotopic specificity. Thus, it is important to control the vapor pressure of the lamps to ensure that radiation of the proper linewidth is emitted. For a further explanation of the relationship between lamp temperature, radiation intensity and linewidth of the radiation see Maya, J., M. W. Grossman, R. Lagushenko and I. F. Waymouth, "Energy Conservation through More Efficient Lighting", Science, 26:435-436 (Oct. 26, 1984), the teachings of which are incorporated herein by reference.

When used in photochemical separation apparatus such as those described by Webster et al., J. Phys. Chem., 85:1302 (1981), the mercury lamps of the present invention allow higher and purer yields of $^{196}$Hg. As stated previously, these lamps can be controlled, in part, by the vapor equilibrium pressure of the mercury within the lamp to produce a predetermined spectral output. This predetermined spectral output allows the excitation of specific mercury isotopes, thereby making these isotopes available for separation via chemical reaction with halides. If the vapor pressure is outside a specific range, the linewidth of the emitted radiation from the lamp increases, thereby allowing mercury isotopes other than those desired to become excited and be separated.

Successful photochemical separation of a single isotope using mercury vapor lamps requires that at least two conditions be fulfilled. First, the spectral bandwidth of the exciting mercury lamp must be sufficiently narrow to excite only the isotopes of interest, the specificity depending on both the spectral bandwidth and the profile of the lamp output, and second, a substrate must be found that reacts with excited mercury atoms to form a stable, separable compound having no reaction with unexcited atoms. Furthermore, both the substrate and reaction product must be photochemically stable in the presence of the radiation emitted from the lamp. The first condition is satisfied in the examples described herein by using a $^{196}$Hg lamp and natural Hg filter combination. Cooling of the lamp below 35° C. is necessary to avoid broadening of the spectral bandwidth and thereby reduce the specificity of the isolated isotopes.

TABLE 1

| Lamp Type | Lamp Temp °C. | Lamp Filter °C. | Lamp Input Power w | Distance of Lamp from Spectrometer cm | Length of Exposed Lamp cm | Irridiance uw/cm² |
| --- | --- | --- | --- | --- | --- | --- |
| N$_{Hg}$ | 30 | — | 80 | 26.8 | 25.7 | 144.6 |
| Microwave | 50 | — | 80 | 26.8 | 25.7 | 360.6 |
| $^{196}$Hg | 20 | 40 | 40 | 50.0 | 6 | 1.6 |
| Microwave & Filter | 20 | 30 | 40 | 50.0 | 6 | 3.05 |
| $^{196}$Hg Microwave | 24° | — | 62 | 50.0 | 3 | 0.59 |
| N$_{Hg}$ Electroded | 26° C. | — | 75 | 100.0 | 3 | 4.98 |

The profile of the output referred to in the first condition includes the extent to which any isotopic lines are overlapped within their Doppler widths as well as any homogeneous or inhomogeneous broadening resulting from the atomic mercury density and substrate pressure used. The second condition is satisfied using the materials specified by Webster et al. in *J. Phys. Chem.*, 85:1302 (1981). In the preferred embodiment these materials include $O_2$, halide compounds such as HCl or diene compounds. These compounds react with the excited mercury to form compounds which are readily isolated.

The invention will now be further and more specifically illustrated by the following example.

EXEMPLIFICATION

An electroded mercury lamp was constructed according to the general details described in FIG. 1. The inner diameter of the envelope was 10 mm and the envelope contained argon (2.0 Torr) and about 1.5 mg natural Hg. The length of the lamp was 40 cm. The filter cold spot temperature was 24° C. and that of the lamp was 19° C. The wall temperature varied from 19° C. to about 50° C. during the evaluation of the lamp.

Figure 3A:
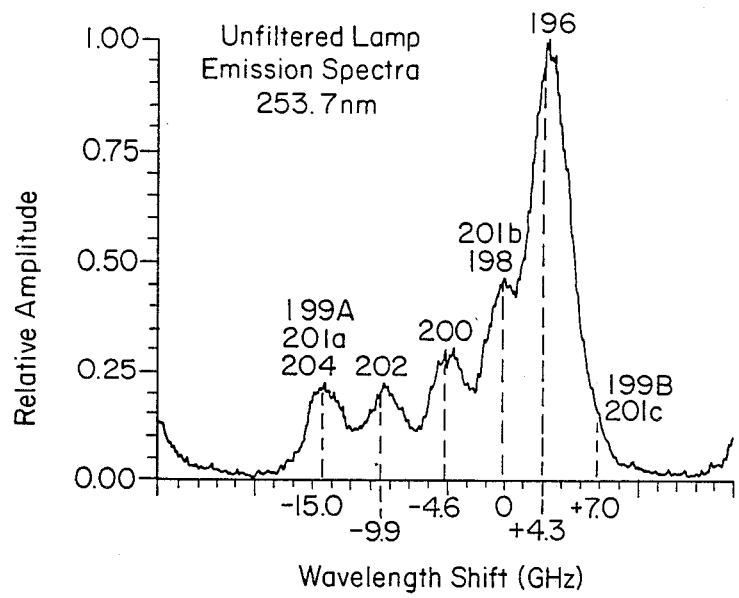
FIG. 3(a) and FIG. 3(b) are plots of the measured output of an electroded photochemical lamp with and without a mercury vapor filter.

The measured unfiltered 253.7 nm hyperfine structure emitted by the lamp is shown in FIG. 3(a). For this lamp, the isotopic distribution by atomic percents is as follows: 50% $^{196}$Hg, 14.6% $^{198}$Hg, 11 6% $^{199}$Hg, 10.8% $^{200}$Hg, 4.6% $^{201}$Hg, 6.9% $^{202}$Hg and 1.4% $^{204}$Hg. The main component is the $^{196}$Hg peak.

Figure 3B:
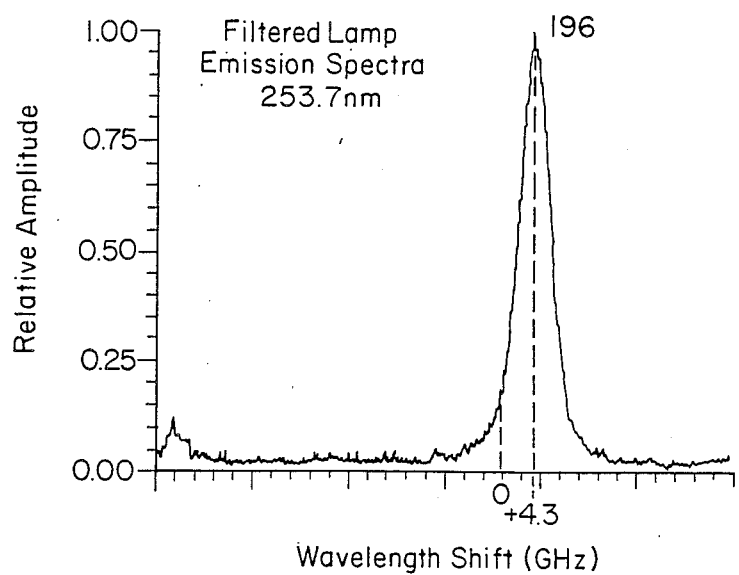

The use of a mercury vapor filter greatly enhances the ratio of $^{196}$Hg emission to other hyperfine structure components. This result is shown in FIG. 3(b). Note that in FIG. 3(b) the wavelength scale is represented as a frequency displacement from the 201b/198 peak.

INDUSTRIAL APPLICABILITY

The invention described herein relates to an apparatus and a process for controlling the spectral linewidth and intensity of emitted radiation from a mercury lamp by controlling the equilibrium vapor pressure of Hg within the lamp envelope. This is accomplished by circulating a heat transfer medium maintained at a controlled temperature around the lamp envelope. The process described is useful for selectively exciting isotopes of mercury to thereby allow their isolation and separation.

EQUIVALENTS

Those skilled in the art will recognize or be able to ascertain, using no more than routine experimentation, many equivalents to the specific embodiments described herein. Such equivalents are intended to be encompassed by the following claims.

I claim:
1. An electroded, mercury photochemical lamp for the isotopic enrichment of mercury, said lamp capable of emitting radiation at a desired spectral linewidth, comprising:
   a. a sealed, elongated, longitudinal envelope containing a vapor phase which comprises mercury vapor and an inert gas;
   b. at least two electrodes positioned and sealed at each longitudinal end of the envelope in a manner which allows each electrode to pass through a seal;
   c. an outer, elongated, longitudinally cylindrical jacket substantially centered around at least one section of the envelope, thereby defining a region for containing a heat transfer medium useful for controlling the temperature of the inner envelope.
2. A lamp as in claim 1 wherein at least one region of the envelope is composed of quartz.
3. A lamp as in claim 1 where the inert gas is selected from the argon, helium, xenon, neon and mixtures thereof.
4. A lamp as in claim 1 wherein the outer elongated jacket comprises quartz.
5. A method for controlling mercury vapor partial pressure in a mercury photochemical lamp, to thereby establish emission of radiation from the mercury photochemical lamp at a desired spectral linewidth, said method comprising:
   a. establishing and controlling a single temperature zone within the lamp, such that the temperature of the zone is uniform; and
   b. adjusting the temperature of the temperature zone until the desired linewidth of radiation is emitted from the lamp.
6. A method as in claim 5 wherein the temperature zone is established and controlled by circulating a heat transfer medium about at least one section of the lamp section so as to maintain the temperature desired in said section.
7. A method as in claim 5 wherein the heat transfer medium is selected from the group consisting of water and inert gases.
8. In a method for producing a mercury compound containing a predetermined isotope of mercury, said method comprising the steps of: providing a source of mercury within a reaction chamber, said reaction chamber containing a mercury photochemical lamp, exciting the mercury with radiation from the mercury lamp said radiation being of a predetermined linewidth and intensity to form thereby isotopically specific mercury ions, and allowing the excited, isotopically specific mercury ions to contact a reactant to thereby allow the formation of a compound containing the desired isotope of mercury, the improvement which comprises:
   a. providing an electroded photochemical lamp;
   b. establishing and controlling a uniform temperature zone around the electroded lamp wherein the temperature zone is established and controlled by circulating a heat transfer medium around at least one region of the lamp; and
   c. adjusting the temperature of the heat transfer medium until the desired linewidth of radiation is emitted from the lamp.
9. The improvement of claim 8 wherein the heat transfer medium is selected from the group consisting of water and inert gases.
10. The improvement of claim 8 wherein mercury source is exposed to radiation having a linewidth of 253.7 nm, to thereby excite $^{196}$Hg for purposes of isolation and separation.
11. The improvement of claim 8 wherein the electroded photochemical lamps comprises:
   a. a sealed, elongated, longitudinal envelope containing a vapor phase which comprises mercury vapor and an inert gas;
   b. at least two electrodes positioned and sealed at each longitudinal end of the envelope in a manner which allows each electrode to pass through a seal;
   c. an outer, elonqated, longitudinally cylindrical jacket substantially centered around at least one section of the envelope, thereby defining a region for containing a heat transfer medium useful for controlling the temperature of the inner envelope.

* * * * *